(12) United States Patent
Acharya et al.

(10) Patent No.: US 12,051,154 B2
(45) Date of Patent: Jul. 30, 2024

(54) SYSTEMS AND METHODS FOR DISTRIBUTED RENDERING USING TWO-LEVEL BINNING

(71) Applicant: Advanced Micro Devices, Inc., Santa Clara, CA (US)

(72) Inventors: Anirudh R. Acharya, Santa Clara, CA (US); Ruijin Wu, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/562,751

(22) Filed: Dec. 27, 2021

(65) Prior Publication Data
US 2022/0207827 A1 Jun. 30, 2022

Related U.S. Application Data

(60) Provisional application No. 63/131,976, filed on Dec. 30, 2020.

(51) Int. Cl.
| | | |
|---|---|---|
| *G06T 17/10* | (2006.01) | |
| *G06T 1/20* | (2006.01) | |
| *G06T 15/00* | (2011.01) | |
| *G06T 15/40* | (2011.01) | |

(52) U.S. Cl.
CPC .............. *G06T 17/10* (2013.01); *G06T 1/20* (2013.01); *G06T 15/005* (2013.01); *G06T 15/40* (2013.01)

(58) Field of Classification Search
CPC ........... G06T 17/10; G06T 1/20; G06T 15/00; G06T 15/40
See application file for complete search history.

(56) References Cited

U.S. PATENT DOCUMENTS

| | | | |
|---|---|---|---|
| 2014/0198119 A1 | 7/2014 | Seetharamaiah et al. | |
| 2015/0379663 A1* | 12/2015 | Gruber | G06T 1/20 |
| | | | 345/522 |
| 2016/0371873 A1* | 12/2016 | Mantor | G06T 15/005 |
| 2019/0371048 A1* | 12/2019 | Su | G06T 15/503 |
| 2020/0090396 A1 | 3/2020 | Holmes et al. | |
| 2020/0402217 A1* | 12/2020 | Golas | G06T 7/0002 |

(Continued)

FOREIGN PATENT DOCUMENTS

| | | |
|---|---|---|
| KR | 20180080517 A | 7/2018 |
| KR | 102116708 B1 | 5/2020 |

OTHER PUBLICATIONS

Xu et al. ("PointWorks Abstraction and Rendering of Sparsely Scanned Outdoor Environments", cs.umn.edu, 2004) (Year: 2004).*

(Continued)

*Primary Examiner* — Sing-Wai Wu
*Assistant Examiner* — Khoa Vu

(57) ABSTRACT

Systems and methods for distributed rendering using two-level binning include processing primitives of a frame to be rendered at a first graphics processing unit (GPU) chiplet in a set of GPU chiplets to generate visibility information of primitives for each coarse bin and providing the visibility information to the other GPU chiplets in the set of GPU chiplets. Each coarse bin is then assigned to one of the GPU chiplets of the set of GPU chiplets and rendered at the assigned GPU chiplet based on the corresponding visibility information.

18 Claims, 4 Drawing Sheets

(56) References Cited

U.S. PATENT DOCUMENTS

2021/0174575 A1\* 6/2021 Mandal ................ G06T 15/405
2022/0156879 A1\* 5/2022 Mrozek .............. G06F 12/0875

OTHER PUBLICATIONS

International Search Report and Written Opinion mailed Apr. 1, 2022 for PCT/US2021/065230, 9 pages.
International Preliminary Report on Patentability issued in Application No. PCT/US2021/065230, mailed Jul. 13, 2023, 6 Pages.

\* cited by examiner

SYSTEMS AND METHODS FOR DISTRIBUTED RENDERING USING TWO-LEVEL BINNING

CROSS-REFERENCE TO RELATED APPLICATIONS

The present application is related to and claims priority to the following application, the entirety of which is incorporated by reference herein: U.S. Provisional Patent Application Ser. No. 63/131,976, entitled "Coarse/Hybrid/Two-Level Binning as a Mechanism for Distributed Rendering."

BACKGROUND

A conventional graphics pipeline for processing three-dimensional (3-D) graphics is formed of a sequence of programmable shaders and fixed-function hardware blocks. Software applications generate frames for rendering by the graphics pipeline and provide the frames to a command processor at the front end of the graphics pipeline, which is typically implemented at a graphics processing unit (GPU). The frames are subdivided into primitives such as triangles or patches that represent portions of objects in the image represented by the frame. For example, the primitives can represent portions of a 3-D model of an object that is visible in the frame. The graphics pipeline processes each primitive in response to a draw call and provides the processed primitives to a shader subsystem, which performs shading of the primitives. The graphics pipeline also includes a rasterizer to perform rasterization of the primitives and a binner to group the primitives into bins, or tiles, that are associated with different portions of the frame. The bins of primitives are then provided to the shader subsystem for additional shading prior to being rendered on a display. Binning is one technique for increasing efficiency and speed in rendering images.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
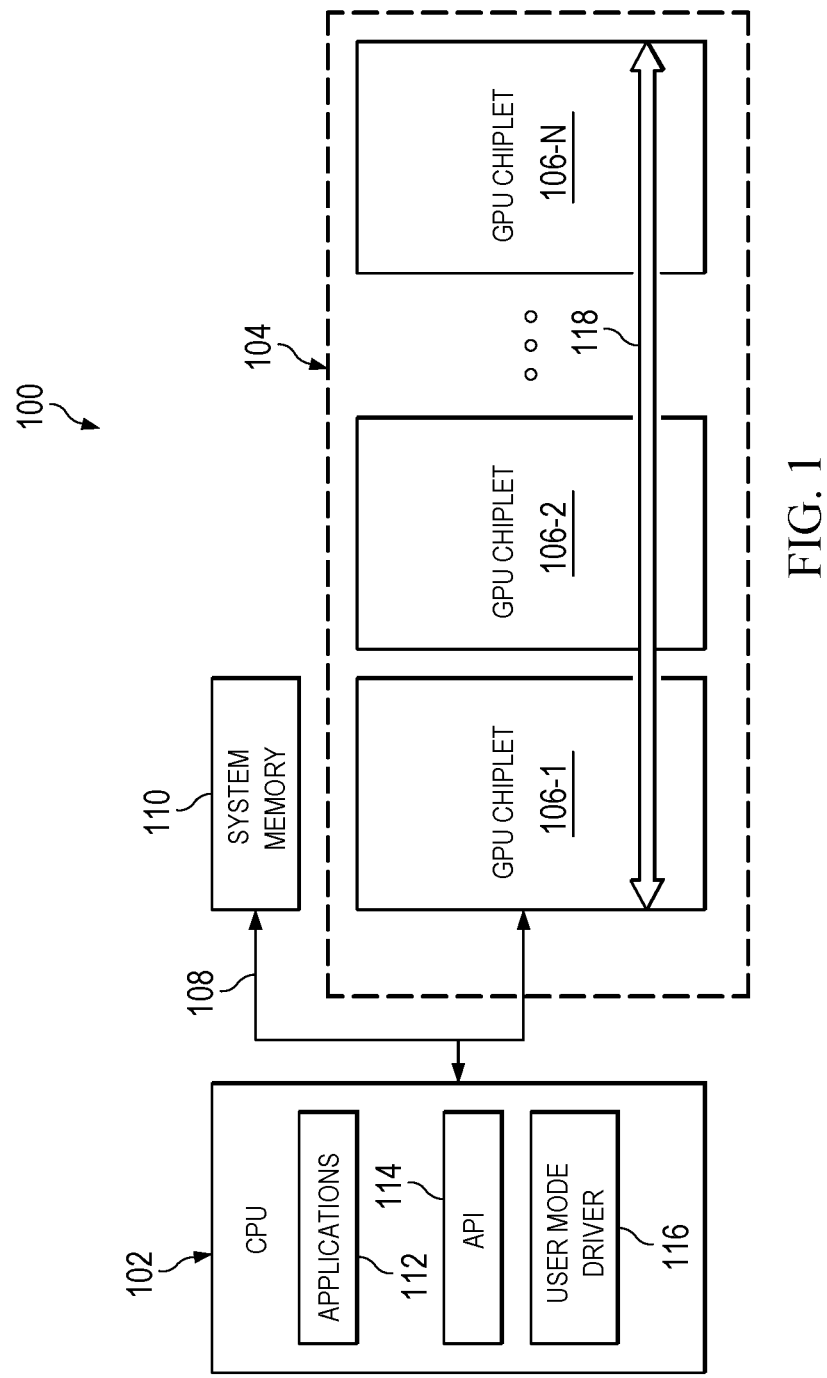
FIG. 1 is a block diagram illustrating a processing system employing multiple GPU chiplets in accordance with some embodiments.

In order to render a frame (that is, to prepare a frame for transfer to and display at a display device, such as a display panel) a GPU translates information about three-dimensional (3D) objects into a two-dimensional (2D) image frame for display. This process, at least in some cases, requires considerable processing power and memory resources. In some cases, to reduce rendering time, a GPU renders primitives using a binning process, wherein the GPU divides the image frame into regions, identifies the primitives that intersect with a given region, and places the identified primitives into a bin corresponding to the given region. Thus, each region of the frame is associated with a corresponding bin, with the bin including the primitives, or portion of the primitives, that intersect with the associated bin. The GPU renders the frame on a per-bin basis by rendering the pixels of the primitives that intersect with the region of the frame corresponding to the bin. This allows the GPU to, at least in some cases, render a frame more efficiently, such as by requiring fewer memory accesses, increasing cache usage, and the like.

An example of a binning process is single-level binning wherein a GPU receives a sequence of primitives and opportunistically segments the primitives into temporally related primitive batches. Sequential primitives are captured until a predetermined condition is met, such as a batch full condition, state storage full condition, or a dependency on previously rendered primitives is determined. When performing primitive batch binning (PBB), an image frame that displays a rendered primitive is divided into several blocks. Each block of the image frame is associated with a respective bin. Each primitive of the received sequence of primitives of a batch intersects one or more bins. For each received primitive in a batch the initial bin intercept is computed, where an initial bin intercept is the upper-most left bin of the image frame which the primitive intersects. After a batch is closed, a first bin for processing is identified. Primitives intercepting the identified bin are processed. For each primitive identified as intercepting the bin, the next bin intercept is identified, and the pixels included in the primitive that are enclosed by the identified bin are sent for detailed rasterization. The next bin intercept is the next upper-most left bin in raster order which the processed primitive intersects.

Another example of a binning process is two-level binning, or "hybrid binning", wherein two types of binning are performed: coarse level binning and fine level binning. In some embodiments, coarse level binning uses large bins (e.g., 32 bins total to cover an entire display area), which reduces binning overhead. Per-coarse-bin visibility information (i.e., which primitives are visible in the bin) is generated during the rendering of the first coarse bin (i.e., coarse bin 0), and is used for rendering other coarse bins. After coarse level binning, fine level binning is performed for each coarse bin, sequentially. In some embodiments, fine level binning involves performing PBB to divide each coarse bin into smaller "fine" bins such as by further binning each coarse bin into an array of fine bins (e.g., having a size of 64×64 pixels each) during PBB-based fine level binning. Each coarse bin is then rendered using rendering information, such as visibility information, generated for the corresponding coarse bin. In some embodiments, two-level binning occurs at the top of the graphics processing pipeline (e.g., prior to vertex processing and rasterization), which contrasts with single-level binning, which occurs in the middle of the graphics processing pipeline, (e.g., after vertex processing and prior to pixel-shading).

Generally, in both single-level binning and two-level binning, each coarse bin is processed in turn (i.e., one bin at a time) by the GPU. This can be inefficient in situations where there are no interdependencies between the bins, that is, in situations in which each bin can be processed without requiring input from the processing of any other bins. Thus, it is desirable to introduce parallelization into bin processing in order to increase the speed and efficiency of rendering images, thus enhancing user experience.

Chiplets have been used successfully in CPU architectures to reduce cost of manufacture and improve yields, as the CPU's heterogeneous computational nature is more naturally suited to separating CPU cores into distinct units that do not require much inter-communication. On the other hand, GPU processing generally includes parallel processing. However, the geometry that a GPU processes includes not only sections of fully parallel work but also work that requires synchronous ordering between different sections. Accordingly, a GPU programming model that spreads sections of work on different threads is often inefficient because the parallelism is difficult to distribute across multiple different working groups and chiplets. In particular, it is difficult and computationally expensive to synchronize the memory contents of shared resources throughout the entire system to provide a coherent view of the memory to applications. Additionally, from a logical point of view, applications are written with the view that the system only has a single GPU. That is, even though a conventional GPU includes many GPU cores, applications are programmed as addressing a single device. Thus, it is desirable to use chiplet technology in a GPU to perform parallel bin processing without the need for costly high-speed interconnection between the GPU chiplets.

FIGS. 1-5 illustrate systems and methods using two-level binning by GPU chiplets to provide parallel processing that does not require high-speed interconnection between the GPU chiplets. The disclosed systems and methods utilize two-level binning in which the rendering is broken down into two phases, namely a visibility phase and a coarse bin rendering phase. During the visibility phase, the geometry of a draw call is processed by a first GPU chiplet of a set of GPU chiplets to generate visibility information while the other GPU chiplets remain free to process unrelated workloads, such as pixel workloads from a previous two-level binning pass. The visibility information generated by the first GPU chiplet specifies what primitives should be processed for each coarse bin. In some cases, the pixel phase of the first bin can also be rendered by the first GPU chiplet during the visibility phase if there are sufficient resources available. During the coarse bin rendering phase of the two-level binning, each GPU chiplet renders a coarse bin assigned to it based on the visibility information from the first GPU chiplet by processing the visible geometry of the assigned bin and its pixel phase. The distribution of coarse bins to GPU chiplets is either static or dynamic depending on design considerations and workload balancing, as described in greater detail below. The parallel processing performed by the GPU chiplets increases rendering speed and maximizes the processing bandwidth of the GPU chiplets.

FIG. 1 is a block diagram illustrating a processing system 100 employing multiple GPU chiplets in accordance with some embodiments. In the depicted example, system 100 includes a central processing unit (CPU) 102 for executing instructions and an array 104 of one or more GPU chiplets, such as the three illustrated GPU chiplets 106-1, 106-2, and through 106-N (collectively, GPU chiplets 106). In various embodiments, and as used herein, the term "chiplet" refers to any device including, but not limited to, the following characteristics: 1) a chiplet includes an active silicon die containing part of the computational logic used to solve a full problem (i.e., the computational workload is distributed across multiples of these active silicon dies); 2) chiplets are packaged together as a monolithic unit on the same substrate; and 3) the programming model preserves the concept that these separate computational dies are a single monolithic unit (i.e., each chiplet is not exposed as a separate device to an application that uses the chiplets for processing computational workloads). In various embodiments, the array 104 of one or more GPU chiplets includes any cooperating collection of hardware and or software that perform functions and computations associated with accelerating graphics processing tasks, data-parallel tasks, nested data-parallel tasks in an accelerated manner with respect to resources such as conventional CPUs, conventional graphics processing units (GPUs), and combinations thereof.

In various embodiments, the CPU 102 is connected via a bus 108 to a system memory 110, such as a dynamic random access memory (DRAM). In various embodiments, the system memory 110 can also be implemented using other types of memory including static random access memory (SRAM), nonvolatile RAM, and the like. In the illustrated embodiment, the CPU 102 communicates with the system memory 110 and also with the GPU chiplet 106-1 over bus 108 that is implemented as a peripheral component interconnect (PCI) bus, PCI-E bus, or other type of bus. However, some embodiments of the system 100 include the GPU chiplet 106-1 communicating with the CPU 102 over a direct connection or via other buses, bridges, switches, routers, and the like.

As illustrated, the CPU 102 includes a number of processes, such as executing one or more application(s) 112 to generate graphic commands and a user mode driver 116 (or other drivers, such as a kernel mode driver). In various embodiments, the one or more applications 112 include applications that utilize the functionality of the GPU chiplets 106, such as applications that generate work in the system 100 or an operating system (OS). An application 112 may include one or more graphics instructions that instruct the GPU chiplets 106 to render a graphical user interface (GUI) and/or a graphics scene. For example, the graphics instructions may include instructions that define a set of one or more graphics primitives to be rendered by the GPU chiplets 106.

In some embodiments, application 112 utilizes a graphics application programming interface (API) 114 to invoke the user mode driver 116 (or a similar GPU driver). The user mode driver 116 issues one or more commands to the array 104 of one or more GPU chiplets for rendering one or more graphics primitives into displayable graphics images. Based on the graphics instructions issued by application 112 to the user mode driver 116, the user mode driver 116 formulates one or more graphics commands that specify one or more operations for GPU chiplets 106 to perform for rendering graphics. In some embodiments, the user mode driver 116 is a part of the application 112 running on the CPU 102. For example, the user mode driver 116 is part of a gaming application running on the CPU 102 in some embodiments. Similarly, in some embodiments, a kernel mode driver (not shown) is part of an operating system running on the CPU 102.

In the depicted embodiment of FIG. 1, a passive crosslink 118 communicably couples the GPU chiplets 106 (i.e., GPU chiplets 106-1 through 106-N) to each other. Although three GPU chiplets 106 are shown in FIG. 1, the number of GPU chiplets in the chiplet array 104 is a matter of design choice and varies in other embodiments. In various embodiments, the passive crosslink 118 includes an interconnect chip or other similar technology for inter-chiplet communications. As a general operational overview, the CPU 102 is communicably coupled to a single GPU chiplet (i.e., GPU chiplet 106-1) through bus 108. CPU-to-GPU transactions or communications from the CPU 102 to the array 104 of chiplets 106 are received at the GPU chiplet 106-1. Subsequently, any inter-chiplet communications are routed through the passive crosslink 118 as appropriate to access memory channels on other GPU chiplets 106. In this manner, the GPU chiplet-based system 100 includes GPU chiplets 106 that are addressable as a single, monolithic GPU from a software developer's perspective (e.g., the CPU 102 and any associated applications/drivers are unaware of the chiplet-based architecture), and therefore avoids requiring any chiplet-specific considerations on the part of a programmer or developer.

Figure 2:
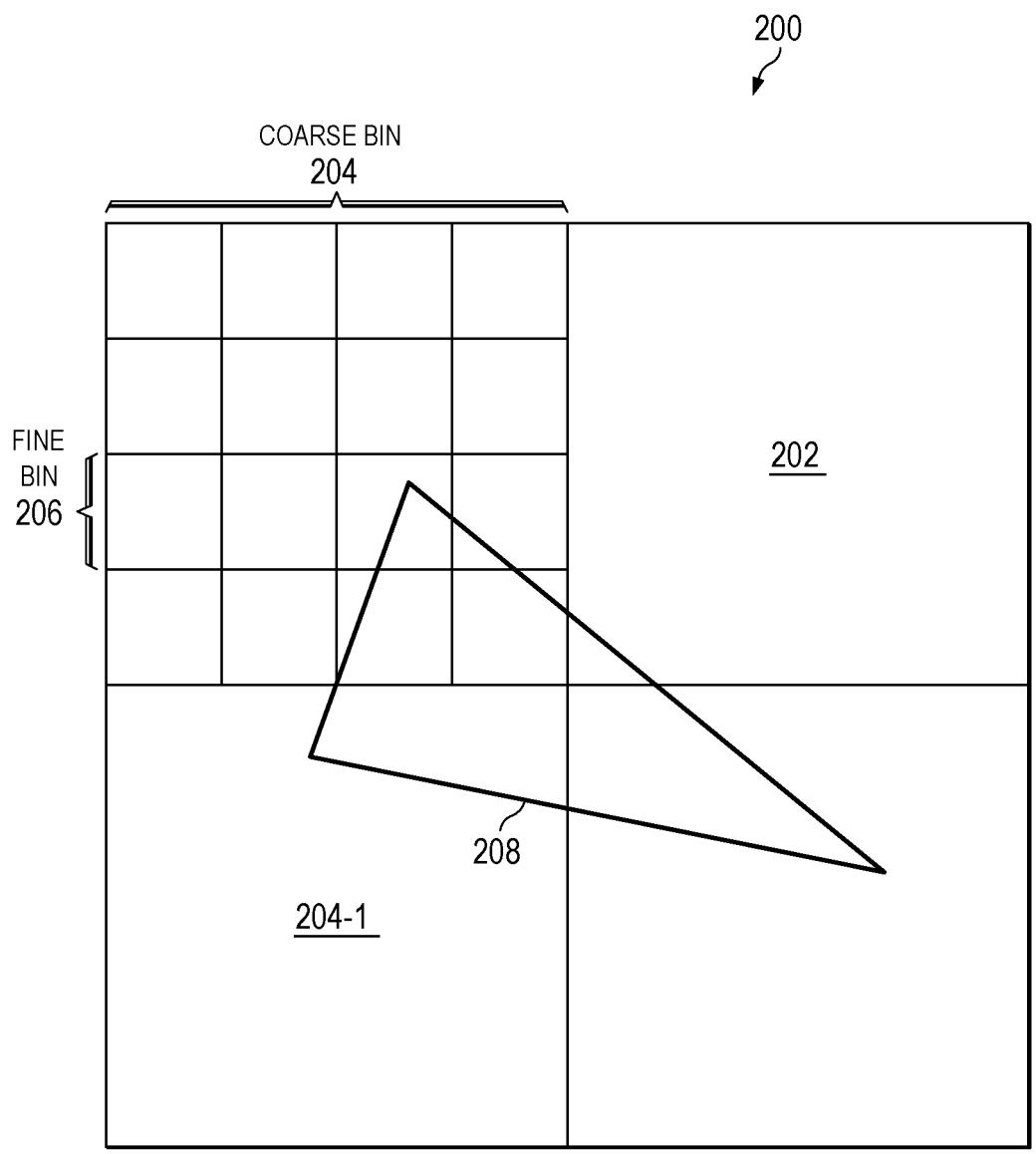
FIG. 2 shows an example of two-level binning 200 of a frame 202 to be rendered by a processing system, such as the processing system of FIG. 1, in accordance with some embodiments.

FIG. 2 shows an example of two-level binning 200 of a frame 202 to be rendered by a processing system, such as processing system 100 of FIG. 1. In two-level binning, two types of binning are performed: coarse level binning and fine level binning. In some embodiments, coarse level binning uses large bins 204 (e.g., 4 bins total to cover an entire display area), which reduces binning overhead. Visibility information of the primitives (e.g., primitive 208) that are visible in each coarse bin is generated during the rendering of the first coarse bin 204-1 and is used for rendering other coarse bins 204. Fine level binning is performed for each coarse bin 204 after coarse level binning. In some embodiments, fine level binning involves performing PBB to divide each coarse bin into smaller bins 206, for example, by binning each coarse bin into a 4×4 array of fine bins 206 during PBB-based fine level binning. Each fine bin 206 is then rendered using rendering information, such as the visibility information, generated for the corresponding coarse bin.

Figure 3:
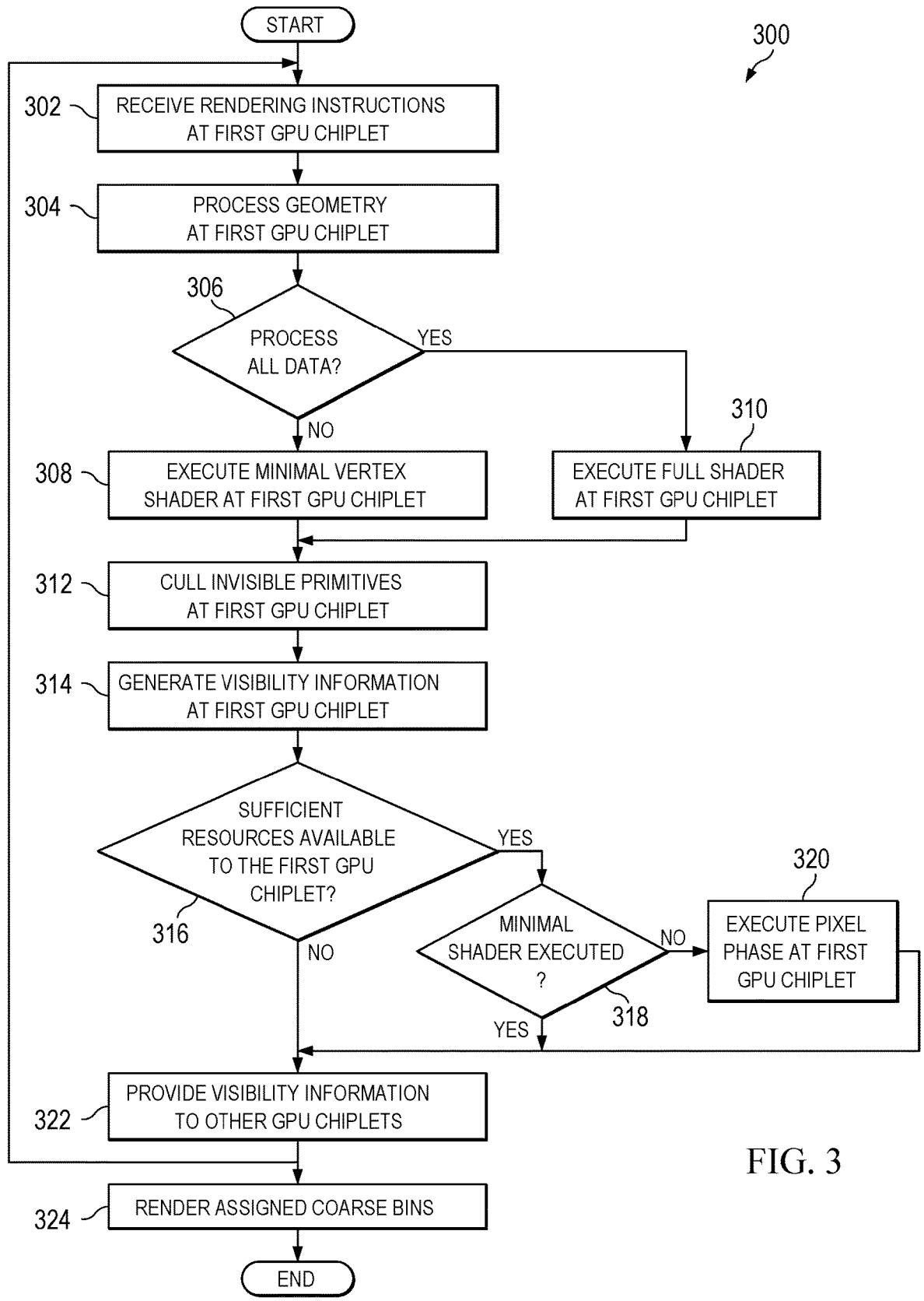
FIG. 3 illustrates a block diagram of a method of distributed rendering in a processing system, such as the processing system of FIG. 1, using two-level binning, in accordance with some embodiments.

FIG. 3 illustrates a block diagram of a method 300 of distributed rendering using two-level binning in a processing system, such as processing system 100 of FIG. 1. Instructions to render a frame are initially received at one of the GPU chiplets 106, such as GPU chiplet 106-1, of the processing system 100, as shown at block 302. GPU chiplet 106-1 then processes the geometry of the frame, as shown at block 304, by dividing the image frame into regions, identifying primitives that intersect with a given region, and assigning the identified primitives to a coarse bin corresponding to the given region. As part of processing the geometry of the frame, a determination is made at block 306 as to whether to process all the geometry data or just the position data provided with the instructions. A minimal vertex shader is executed at block 308 in response to a determination that only the position data should be processed. Otherwise, a full shader is executed to process all of the provided data at block 310. At block 312, GPU chiplet 106-1 applies culling to remove those primitives that were identified but will not be visible in the rendered frame (i.e., the invisible primitives). At block 314, GPU chiplet 106-1 generates per-coarse-bin visibility information.

In some embodiments, as shown at block 316, a determination is made of whether sufficient resources are available to GPU chiplet 106-1 to execute the pixel phase of a coarse bin. At block 318, if sufficient resources are available, a determination is made as to whether the minimal shader was executed at block 306. If sufficient resources are available and the minimal shader was not executed, GPU chiplet 106-1 executes the pixel phase of one of the coarse bins at block 320. For example, in cases where pixel processing and vertex processing are executed by the same shader hardware, if it is determined that there are enough shader resources to process the vertex and the pixels, the system will proceed with pixel processing.

While GPU chiplet 106-1 is executing the visibility phase of the two-level binning, the other GPU chiplets are available to execute other workloads that do not have an immediate dependency on the visibility information being generated by GPU chiplet 106-1. For example, in some embodiments, GPU chiplet 106-2 processes a pixel workload from a previous two-level binning pass or an asynchronous compute workload while GPU chiplet 106-1 is executing the visibility phase of the two-level binning, as these processes do not require input from the visibility phase executed by GPU 106-1. At block 322, GPU chiplet 106-1 provides the visibility information, specifying which primitives are to be processed for each bin, to each of the other GPU chiplets 106. At block 324, each GPU chiplet 106, running in coarse bin rendering mode, renders the coarse bin(s) assigned to it by processing the visible geometry of the bin and its pixel phase. Once all the coarse bins assigned to GPU chiplet 106-1 have been processed in the coarse bin rendering phase, GPU chiplet 106-1 is made available to receive instructions for rendering a next frame (i.e., a second pass) and begins processing the geometry of the next frame while the other GPU chiplets 106 are still rendering the coarse bins assigned to them during the first pass.

Figure 4:
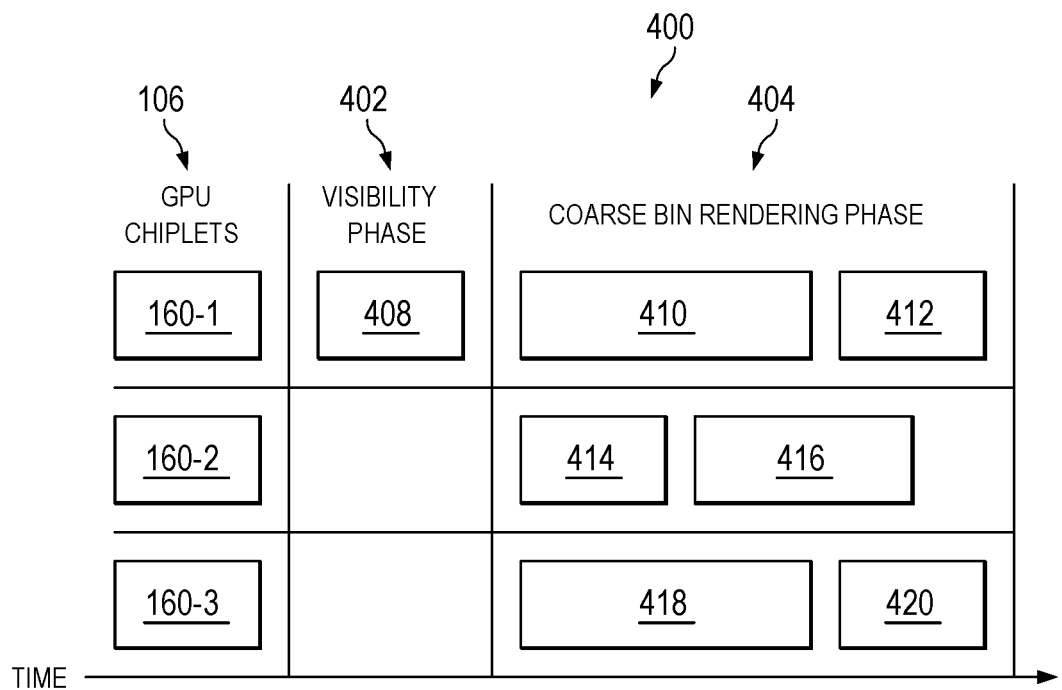
FIG. 4 illustrates a block diagram of static distribution of coarse bins during rendering by multiple GPU chiplets, such as the GPU chiplets of FIG. 1, in accordance with some embodiments.

FIG. 4 shows a block diagram of static distribution 400 of coarse bins during rendering by multiple GPU chiplets, such as the GPU chiplets 106 of FIG. 1. During the visibility phase 402 of the two-level binning, GPU chiplet 106-1 runs in visibility mode to process the geometry of the frame to be rendered, along with culling any invisible primitives, in order to generate per-coarse bin visibility information 408. Also during the visibility phase 402, other GPU chiplets 106 of the processing system 100 are executing other workloads that do not depend on the visibility information being generated by GPU chiplet 106-1. In the coarse bin rendering phase 404, each coarse bin is assigned to one of the GPU chiplets 106 independent of the current workload or availability of the GPU chiplets 106. For example, GPU chiplet 106-1 is always assigned to render coarse bins 410 and 412, GPU chiplet 106-2 is always assigned to render coarse bins 414 and 416, and GPU chiplet 106-3 is always assigned to render coarse bins 418 and 420. Static distribution of the coarse bins 410-420 can result in inefficiencies if some of the coarse bins 410-422 have smaller workloads and require less processing time as some of the GPU chiplets 106 may be idle for a time while the remaining GPU chiplets 106 complete rendering of their respective coarse bins. However, static distribution of coarse bins requires minimal processing resources to distribute bins and can avoid the added complexity of dynamic distribution of the coarse bins between the GPU chiplets 106.

Figure 5:
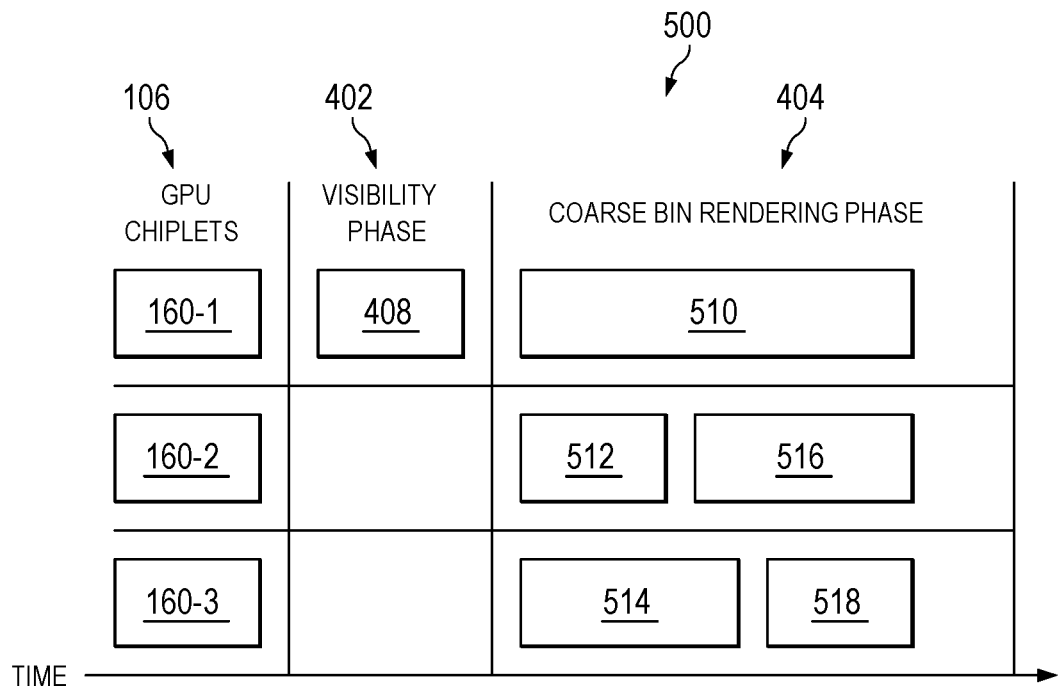
FIG. 5 illustrates a block diagram of dynamic distribution of coarse bins during rendering by multiple GPU chiplets, such as GPU chiplets of FIG. 1, in accordance with some embodiments.

FIG. 5 shows a block diagram of dynamic distribution 500 of coarse bins during rendering by multiple GPU chiplets, such as GPU chiplets 106 of FIG. 1. During the visibility phase 402 of the two-level binning, GPU chiplet 106-1 runs in visibility mode to process the geometry of the frame to be rendered, along with culling any invisible primitives, in order to generate per-coarse bin visibility information 408. Additionally, during the visibility phase 402, other GPU chiplets 106 of the processing system 100 are executing other workloads that do not depend on the visibility information being generated by GPU chiplet 106-1. In the coarse bin rendering phase 304, each coarse bin is assigned to one of the GPU chiplets 106 based on the current workload or availability of the GPU chiplets 106. For example, the first three coarse bins 510, 512, and 514 are assigned to GPU chiplet 106-1, GPU chiplet 106-2, and GPU chiplet 106-3, respectively. The remaining coarse bins 416 and 418 are assigned to one of GPU chiplet 106-1, GPU chiplet 106-2, or GPU chiplet 106-3 based on the workload of the coarse bins already assigned to each of the GPU chiplets 106 and based on the workload of the coarse bin being assigned so as to balance the workloads of the GPU chiplets 106.

In the example shown in FIG. 5, GPU chiplet 106-1 is assigned coarse bin 510, which has a relatively large workload, and GPU chiplet 106-2 is assigned coarse bin 512, which has a relatively small workload compared to that of coarse bin 510. Coarse bin 516, which has a medium workload, is assigned to GPU chiplet 106-2 to balance the overall workload of GPU chiplet 106-2 with the workload of GPU chiplet 106-1 and minimize downtime of the GPU chiplets 106 during the coarse bin rendering phase 504. Likewise, coarse bin 518, which has a relatively small workload, is assigned to GPU chiplet 106-3 based on the medium workload of coarse bin 514 already assigned to GPU chiplet 106-3 and the relatively small workload of coarse bin 518. Thus, while dynamic distribution of coarse bins to each of the GPU chiplets 106 requires additional logic and processing to analyze the workloads of the coarse bins and determine the most efficient distribution between the GPU chiplets 106, dynamic distribution maximizes efficient use of the GPU chiplets 106 by balancing the workloads of the GPU chiplets.

In some embodiments, the apparatus and techniques described above are implemented in a system including one or more integrated circuit (IC) devices (also referred to as integrated circuit packages or microchips), such as the processing system 100 and GPU chiplets 106 described above with reference to FIGS. 1-4. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
  processing, in a first phase, primitives of a frame to be rendered at a first graphics processing unit (GPU) chiplet in a set of GPU chiplets to generate visibility information of primitives for each of a plurality of coarse bins;
  assigning each coarse bin of the plurality of coarse bins to one of the GPU chiplets of the set of GPU chiplets; and rendering, in a second phase after the first phase commences, multiple coarse bins of the plurality of coarse bins in parallel at multiple GPU chiplets of the set of GPU chiplets based on the corresponding visibility information.

2. The method of claim 1, wherein rendering each of the plurality of coarse bins comprises processing visible primitives and a pixel phase of each of the plurality of coarse bins.

3. The method of claim 1 further comprising:
providing, to each GPU chiplet of the set of GPU chiplets, the corresponding visibility information comprising primitives for the coarse bin assigned to the corresponding GPU chiplet.

4. The method of claim 1, further comprising:
culling, by the first GPU chiplet, invisible primitives from the primitives of the frame to be rendered.

5. The method of claim 1, wherein assigning each coarse bin of the plurality of coarse bins comprises statically distributing each of the plurality of coarse bins to each of the GPU chiplets in the set of GPU chiplets.

6. The method of claim 1, wherein assigning each coarse bin of the plurality of coarse bins comprises dynamically distributing each of the plurality of coarse bins to each of the GPU chiplets in the set of GPU chiplets based on workload balancing.

7. The method of claim 1, wherein one GPU chiplet of the multiple GPU chiplets renders a first coarse bin of the plurality of coarse bins in parallel with another GPU chiplet of the multiple GPU chiplets rendering a second coarse bin of the plurality of coarse bins.

8. A non-transitory computer readable medium embodying a set of executable instructions, the set of executable instructions to manipulate at least one graphics processing unit (GPU) chiplet to:
generate, in a first phase, visibility information for primitives intersecting each of a plurality of coarse bins representing geometry of a frame to be rendered; and
provide the visibility information to a set of GPU chiplets, wherein each GPU chiplet of the set of GPU chiplets renders, in a second phase after the first phase commences, at least one of the plurality of coarse bins based on the corresponding visibility information, wherein one GPU chiplet in the set of GPU chiplets renders at least one of the plurality of coarse bins in parallel with another GPU chiplet of the set of GPU chiplets rendering at least another one of the plurality of coarse bins.

9. The non-transitory computer readable medium of claim 8, wherein each GPU chiplet of the set of GPU chiplets renders at least one of the plurality of coarse bins by processing visible geometry and a pixel phase of each of the plurality of coarse bins.

10. The non-transitory computer readable medium of claim 8, wherein the visibility information comprises primitives to be processed for each of the plurality of coarse bins.

11. The non-transitory computer readable medium of claim 8, further comprising a set of executable instructions to manipulate at least one graphics processing unit (GPU) chiplet to:
cull invisible primitives from the geometry of the frame to be rendered.

12. The non-transitory computer readable medium of claim 8, wherein each GPU chiplet of the set of GPU chiplets is assigned to render at least one of the plurality of coarse bins based on a static distribution of the plurality of coarse bins.

13. The non-transitory computer readable medium of claim 8, wherein each GPU chiplet of the set of GPU chiplets is assigned to render at least one of the plurality of coarse bins based on a dynamic distribution of the plurality of coarse bins to balance workloads of the set of GPU chiplets.

14. A system comprising:
a first graphics processing unit (GPU) chiplet running in a visibility mode to generate, in a first phase, visibility information for each of a plurality of coarse bins representing geometry of a frame to be rendered; and
a set of GPU chiplets running in coarse bin rendering mode, wherein each of the GPU chiplets of the set of GPU chiplets receives the visibility information for one of the plurality of coarse bins from the first GPU chiplet and renders, in a second phase after the first phase commences, the one of the plurality of coarse bins in parallel with another GPU chiplet of the set of GPU chiplets rendering another coarse bin of the plurality of coarse bins based on the corresponding visibility information.

15. The system of claim 14, wherein each of the GPU chiplets of the set of GPU chiplets renders the one of the plurality of coarse bins by processing visible geometry and a pixel phase of the one of the plurality of coarse bins.

16. The system of claim 14, wherein each GPU chiplet of the set of GPU chiplets is assigned to render the one of the plurality of coarse bins based on a static distribution of the plurality of coarse bins.

17. The system of claim 14, wherein each GPU chiplet of the set of GPU chiplets is assigned to render the one of the plurality of coarse bins based on a dynamic distribution of the plurality of coarse bins to balance workloads of the set of GPU chiplets.

18. The system of claim 14, wherein the first GPU chiplet culls invisible primitives from the geometry of the frame to be rendered to generate the visibility information.

* * * * *